United States Patent

Morse et al.

[11] Patent Number: 5,279,454
[45] Date of Patent: Jan. 18, 1994

[54] STRAIGHT THROUGH LATERAL CONSTRAINT

[75] Inventors: John Morse, Rochester; Leslie Bunting, Pittsford, both of N.Y.

[73] Assignee: Eastman Kodak Company, Rochester, N.Y.

[21] Appl. No.: 874,144

[22] Filed: Apr. 24, 1992

[51] Int. Cl.$^5$ .................. B65H 20/00; B65H 23/038
[52] U.S. Cl. ............................. 226/88; 226/15; 226/190; 226/168; 271/251
[58] Field of Search ............... 400/633, 641, 636, 619, 400/611, 586, 642; 226/15, 88, 190, 168, 17; 271/249, 250, 251, 188, 209; 412/306

[56] References Cited

U.S. PATENT DOCUMENTS

| | | | |
|---|---|---|---|
| 1,909,504 | 5/1933 | Robbins . | |
| 3,084,931 | 4/1963 | Hanson | 271/250 |
| 3,558,109 | 1/1971 | Sofue | 263/3 |
| 3,558,254 | 1/1971 | Cahill | 83/176 |
| 3,592,035 | 1/1971 | Buccicone | 72/227 |
| 3,809,301 | 5/1974 | Feier et al. | 226/25 |
| 3,929,327 | 12/1975 | Olson | 271/250 |
| 4,011,977 | 3/1977 | Bettenhausen et al. | 226/88 |
| 4,055,289 | 10/1977 | Kaiser et al. | 226/92 |
| 4,059,203 | 11/1977 | Wright | 221/73 |
| 4,426,073 | 1/1984 | Mizuma | 271/251 |
| 4,546,964 | 10/1985 | Linthout | 271/251 X |
| 4,621,801 | 11/1986 | Sanchez | 271/251 |
| 4,744,555 | 5/1988 | Naramore et al. | 271/251 |
| 4,809,968 | 3/1989 | Malachowski | 271/251 |
| 5,031,894 | 7/1991 | Bedzyk et al. | 271/240 |

FOREIGN PATENT DOCUMENTS 0348897 6/1989 European Pat. Off. .

Primary Examiner—Clifford D. Crowder
Assistant Examiner—Paul C. Lewis
Attorney, Agent, or Firm—Ronald Reichman

[57] ABSTRACT

A system for establishing the lateral position of a web without requiring the web path to change direction. The system utilizes a support surface that is curved in its transverse direction concave towards the web, a guide extending longitudinally along the surface, and a roller that is positioned against the support surface so that the web will be urged laterally against the guide and will conform to the curvature of the surface, thereby increasing the lateral column strength of the web.

15 Claims, 4 Drawing Sheets

STRAIGHT THROUGH LATERAL CONSTRAINT

BACKGROUND OF THE INVENTION

1. Field of the Invention

This invention relates generally to the field of material transport systems and particularly to a web transport system.

Material transport systems move various types of material from one location to another. Some material transport systems are used to move thin materials. An example of a thin material is a filmstrip or filmstrip and paper carrier combination or web.

When a filmstrip is printed for the first time (first order), the various 24 and 36 exposure filmstrips are joined end to end to form a continuous constant width filmstrip roll. In order to make photographic printers more efficient during reorder operations, the various frames of a filmstrip, that a customer wants reprinted are attached to a paper carrier. The paper carrier forms a roll containing many frames, that are randomly attached to one side of the paper carrier. Thus, in certain roll locations there will be filmstrip and a paper carrier and in other roll locations there will only be a paper carrier. Hence, the width of the filmstrip paper carrier combination varies. The paper carrier filmstrip combination is able to be rapidly moved through the printer. Whereas, if the filmstrip was not connected to a paper carrier, individual frames on four frame filmstrips would have to be moved through the printer.

Rollers may be used to guide a first order filmstrip by contacting either edge of the filmstrip. However, if the filmstrip is connected to a paper carrier, the guide roller may only contact the paper carrier portion of the roll, since the filmstrip segments are too flimsy and are intermittent.

The lateral position of the filmstrip and the filmstrip paper carrier combination needs to be accurately controlled to permit the bar code on the filmstrip and/or the code on the paper carrier to be read. Devices contained within the printer use the information contained in the above codes to set or adjust various photographic printer parameters to produce better quality prints. Thus, precise lateral placement of the filmstrip and filmstrip paper carrier combination is necessary for proper scanning, printing and transport operations.

One of the methods utilized by the prior art to obtain accurate lateral positioning of a filmstrip and paper carrier combination was to urge one edge of the paper carrier against a guiding member having a fixed lateral position. The filmstrip paper carrier combination was very thin. Thus, the filmstrip paper carrier combination did not support significant lateral locating forces without buckling.

Buckling caused inaccurate edge reading of the filmstrip. The buckling of the filmstrip and paper carrier combination was reduced by increasing the lateral column strength of the paper carrier. The lateral column strength of the paper carrier was increased by curving the paper carrier around a transverse axis. The above transverse axis curvature required a change in the filmstrip paper carrier direction from before the guide to after the guide. Thus, additional rollers were needed to change the direction of travel of the filmstrip paper carrier combination to accurately laterally position the filmstrip and paper carrier.

If the filmstrip and filmstrip paper carrier combination travels a large distance, additional rollers are needed to accurately control the lateral position of the filmstrip and the filmstrip paper carrier combination.

If the speed of the filmstrip moving through the photographic printer was increased above 18 inches per second, prior art rollers had difficulty in accurately controlling the lateral position of the filmstrip. The prior art difficulty in accurately controlling the lateral position of the filmstrip was amplified on reorder.

SUMMARY OF THE INVENTION

The present invention overcomes the disadvantages of the prior art by providing a device: that accurately establishes the lateral position of a filmstrip and paper carrier combination (web) or any other web configuration at a particular longitudinal location; that is capable of moving a filmstrip and paper carrier combination a large distance without adding additional rollers; and that reduces buckling of the filmstrip and paper carrier combination.

The foregoing is achieved by providing:

a longitudinal web support surface that is curved in its transverse direction concave towards the web;

a guide extending longitudinally along the surface; and a roller positioned against the surface, the roller will be deformed when rotated and urge a web laterally against the guide so that the web will conform to the curvature of the surface to increase the lateral column strength of the web.

DESCRIPTION OF THE PREFERRED EMBODIMENT

Figure 1:
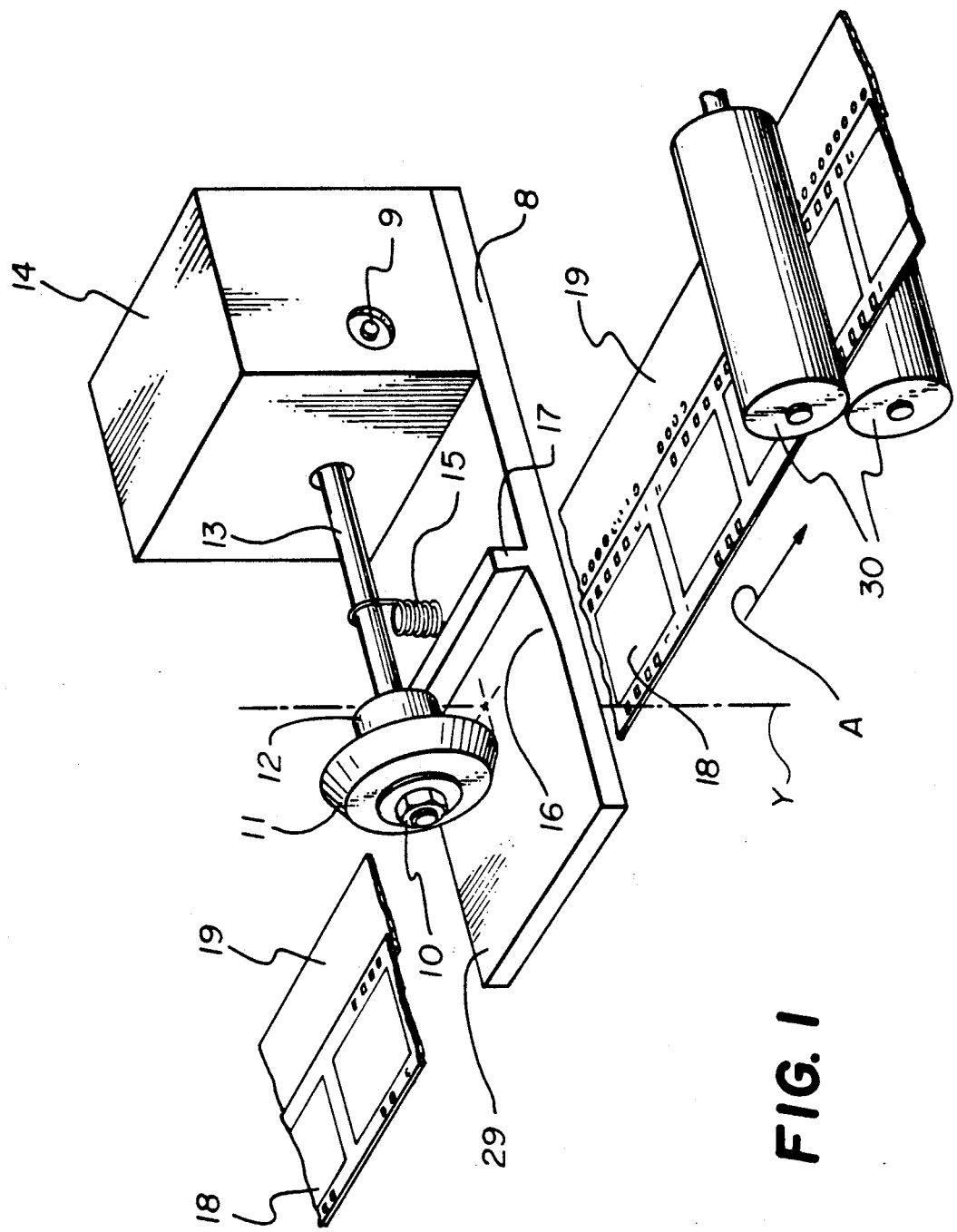
FIG. 1 is a perspective representation of a filmstrip and paper carrier being positioned by the apparatus of the invention.

Referring now to the drawings in detail and more particularly to FIG. 1, the reference character 11 represents a canted or conically shaped roller. The canted roller functions for only one direction of web transport whereas the conical roller provides the lateral web position function in both direction of longitudinal web transport. Roller 11 may be constructed from any compliant elastomeric material, i.e., urethane, polypropylene, etc. The durometer of roller 11 is between 20 and 80 Shore A. Nut 10 and hub 12 allow roller 11 to rotate on one end of shaft 13. The other end of shaft 13 is connected to block 14 by pivot 9. Block 14 is connected to plate 8. Positioned under roller 11 is contoured surface 16, of plate 8. Flat surface 29 of plate 8 is tangent to surface 16. The location of the tangent is approximately at the location where roller 11 no longer presses paper carrier 19 against surface 16. Lateral edge guide 17 is connected to surface 16. Filmstrip 18 will move along surface 29 and paper carrier 19 will pass between surface 16 and roller 11. Rollers 30 will move filmstrip 18 and paper carrier 19 in the direction shown by arrow A. Roller 11 and attachments thereto may be freely pivoted about vertical axis y to allow paper carrier 19 transport direction to self align to drive rollers 30 without tearing stresses in paper carrier 19. Spring 15 is connected to plate 8 and shaft 13. Spring 15 places a downward load on paper carrier 19 through roller 11. The aforementioned load deforms roller 11 in such a manner that the deformation and rotation of roller 11 will cause paper carrier 19 to conform to the curvature of surface 16 and the edge of paper carrier 19 will be pushed against lateral edge guide 17. The lateral column strength of paper carrier 19 is increased by forcing paper carrier 19 to adapt to the concave shape of contoured surface 16.

At the longitudinal location of lateral edge guide 17, surface 16 has a transverse curvature, concave, toward paper carrier 19. The axis of curvature of surface 16 is parallel to arrow A in the transverse region between roller 11 and lateral edge guide 17. The lateral force applied to the relatively thin filmstrip 18 and paper carrier 19 will cause paper carrier 19 to conform into contoured surface 16 where carrier 19 is rigidly supported against further deformation and thus receives a substantial degree of lateral direction compression strength. At the same time as the above is happening filmstrip 18 will move in direction A along surface 29.

Figure 2:
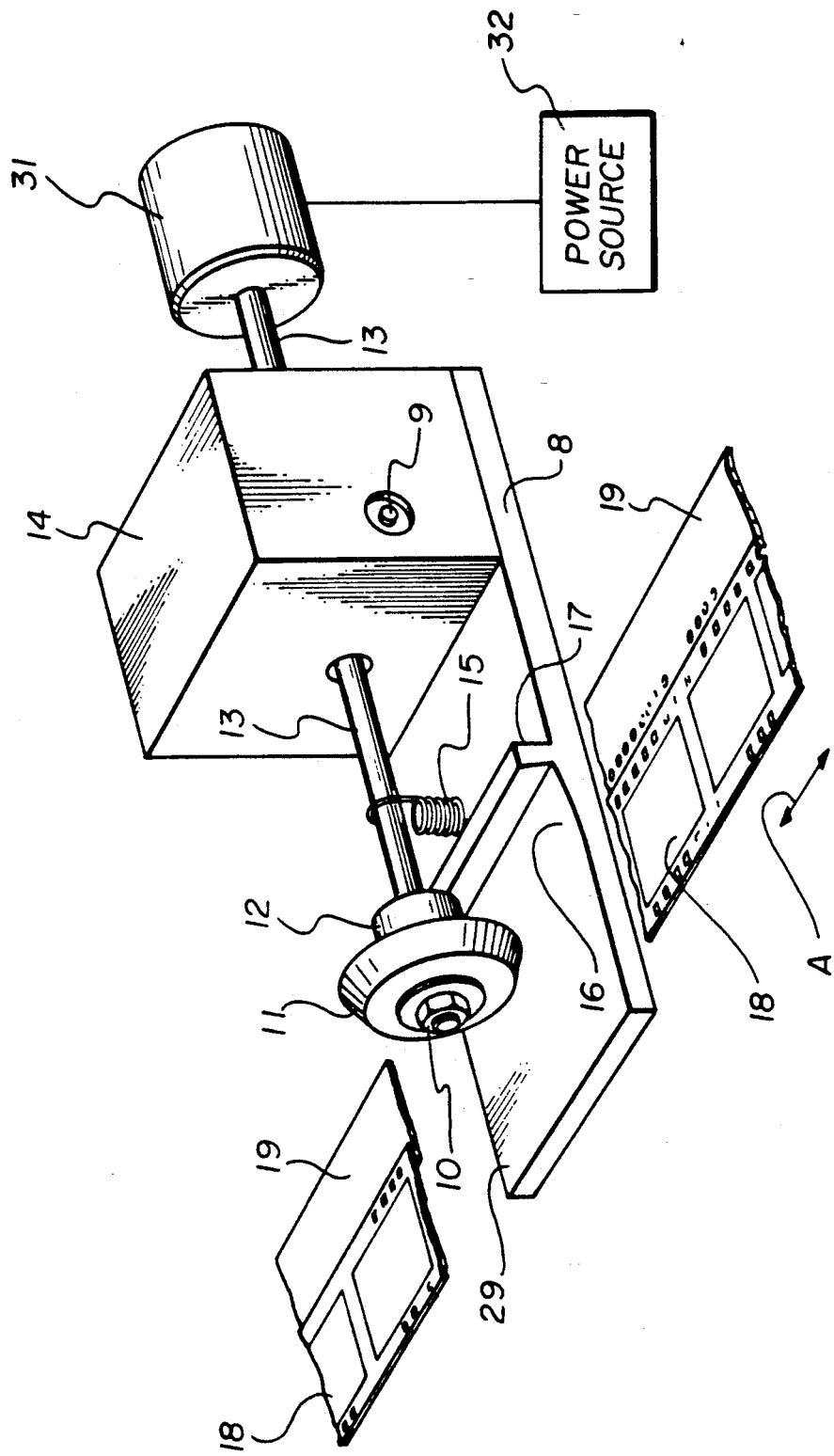
FIG. 2 is a perspective representation of the apparatus shown in FIG. 1, wherein roller 11 is driven by a motor.

FIG. 2 depicts the embodiment shown in FIG. 1, with motor 31 replacing rollers 30. Motor 31 is coupled to shaft 13 and power source 32 supplies power to motor 31. Motor 31 will rotate shaft 13 and roller 11 will move filmstrip 18 and paper carrier 19 in the directions shown by arrow A. Spring 15 places a downward load on paper carrier 19 through roller 11. The aforementioned load deforms roller 11 in such a manner that the deformation and rotation of roller 11 will cause paper carrier 19 to conform to the curvature of surface 16 and the edge of paper carrier 19 will be pushed against lateral edge guide 17. The lateral column strength of paper carrier 19 is increased by forcing paper carrier 19 to adapt to the shape of contoured surface 16.

At the longitudinal location of lateral edge guide 17, surface 16 has a transverse curvature, concave, toward paper carrier 19. The axis of curvature of surface 16 is parallel to arrow A in the transverse region between roller 11 and lateral edge guide 17. The lateral force applied to the relatively thin filmstrip 18 and paper carrier 19 will cause paper carrier 19 to conform into contoured surface 16 where carrier 19 is rigidly supported against further deformation and thus receives a substantial degree of lateral direction compression strength. At the same time as the above is happening filmstrip 18 will move in direction A along surface 29.

Figure 3:
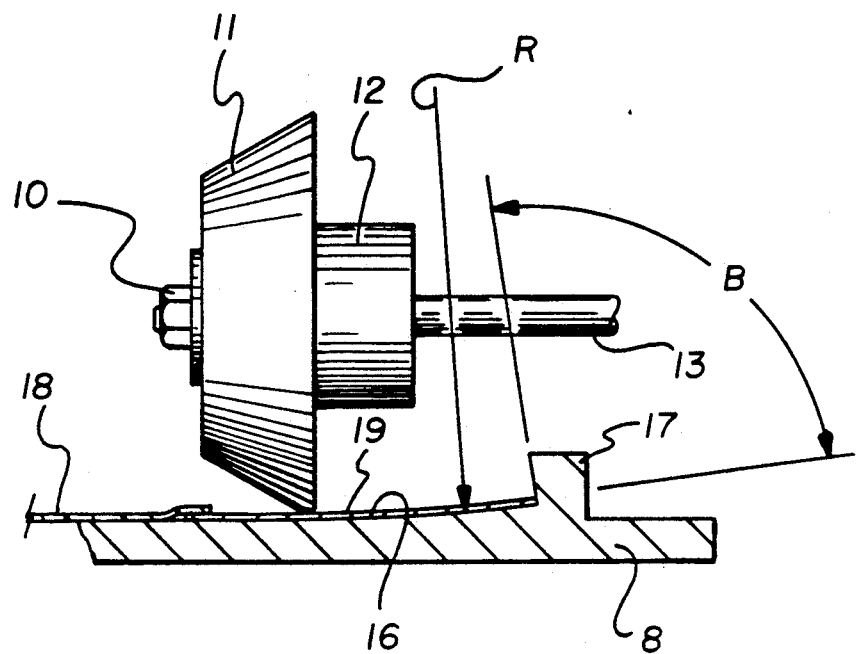
FIG. 3 is a sectional view of roller 11 and surface 16.

FIG. 3 is a sectional view depicting roller 11 and surface 16 of FIG. 1. Roller 11 is connected to shaft 13 by hub 12 and nut 10 and paper carrier 19 is placed between roller 11 and surface 16. Lateral edge guide 17 and surface 16 form an angle B. Angle B is obtuse to prevent escape of the edge of paper carrier 19 for example between 90 and 100 degrees. The radius of curvature R of surface 16 is between one inch and ten inches.

Figure 4:
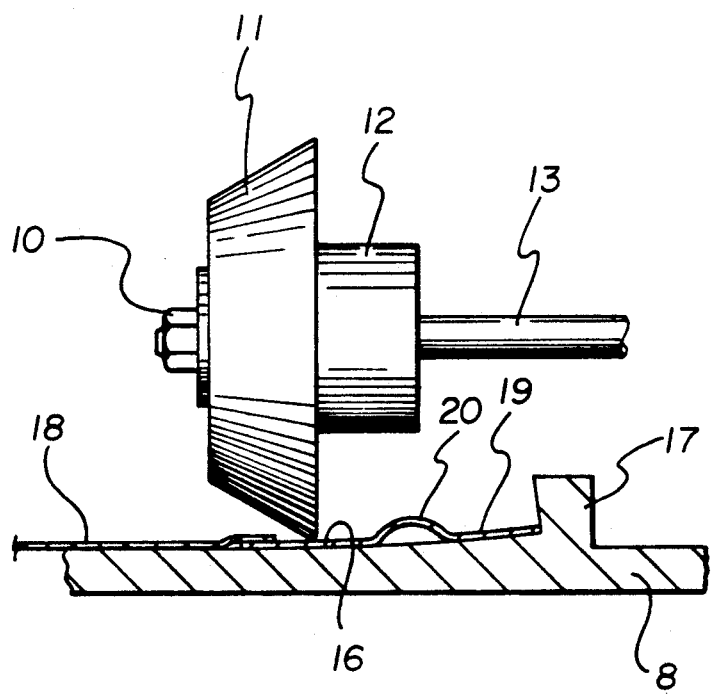
FIG. 4 is a sectional view of roller 11 and surface 16 showing a preformed crease in paper carrier 19.

FIG. 4 is the same sectional view of roller 11 and surface 16 of FIG. 2. However, in this view paper carrier 19 is shown with a preformed crease 20. Preformed crease 20 may be formed by operator carelessness, i.e., filmstrip 18 and paper carrier 19 are dropped and someone steps on paper carrier 19. When preformed crease 20 passes between roller 11 and edge guide 17, the severity of crease 20 would be increased by the lateral force applied by roller 11 to paper carrier 19 resulting in buckle failure. The above condition would ultimately severely damage paper carrier 19 and eliminate the proper lateral location of paper carrier 19. Crease 20 may be flattened by the alternate embodiments of this invention depicted in FIGS. 5 and 6.

Figure 5:
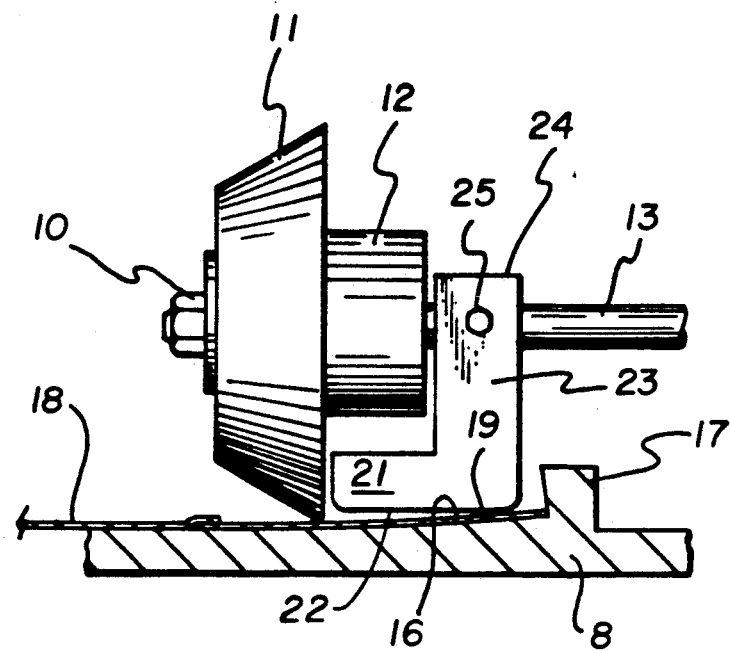
FIG. 5 is a perspective representation of an alternate embodiment of the invention.

FIG. 5 shows the addition of a fixed upper constraint guide 21 to shaft 13 of FIG. 1. Guide 21 comprises: a lower plate 22, that is positioned above surface 16; and a side plate 23, that is perpendicular to plate 22. Side plate 23 is connected to shaft 13 by bolt 25. Paper carrier 19 will be positioned between guide 21 and surface 16. As paper carrier 19 enters guide 21, plate 22 will flatten any pre-formed creases that exist in carrier 19 and prevent an increase in the crease height of the pre-formed crease.

Figure 6:
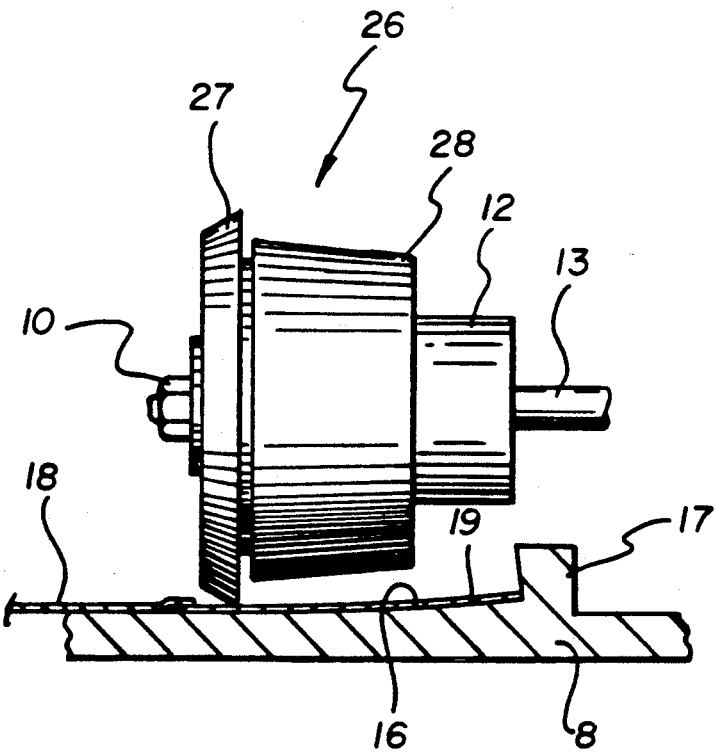
FIG. 6 is a perspective representation of another alternate embodiment of the invention.

FIG. 6 replaces roller 11 of FIG. 1, with a roller and rotation assembly 26. Assembly 26 comprises: roller 27, and member 28. Hub 12 and nut 10 holds assembly 26 against one end of shaft 13. Member 28 may be constructed from any compliant material, i.e., urethane, polypropylene, etc., or from any rigid material i.e., aluminum, thermoplastic, etc. The durometer of roller 27 and volume of rotation 28 is between 20 and 80 Shore A. Roller 27 may be conically, canted or cylindrically shaped and volume of rotation 28 may be contoured to the shape of surface 16.

Paper carrier 19 will be positioned between rotation assembly 26 and surface 16. As paper carrier 19 approaches assembly 26, substitute member 28 will flatten any pre-formed creases that exist in carrier 19 and prevent an increase in the crease height of the pre-formed crease.

The above specification describes a new and improved straight through lateral constraint device. It is realized that the above description may indicate to those skilled in the art additional ways in which the principles of this invention may be used without departing from the spirit. It is, therefore, intended that this invention be limited only by the scope of the appended claims.

What is claimed is:

1. A lateral constraint system for accurately positioning a web, said system comprises:
    a longitudinal web support surface that is curved in its transverse direction concave towards the web;
    a guide extending longitudinally along said surface; and
    a roller positioned against said surface;
    means for deforming said roller, when rotated to urge a web laterally against said guide so that the web will conform to the curvature of said surface to increase the strength of the web.

2. The system claimed in claim 1, further including:
    a flat web support surface that is tangential relative to said surface to support any portion of said web that extends beyond the curved portion of said surface.

3. The system claimed in claim 1, wherein said roller is canted toward said guide.

4. The system claimed in claim 1, wherein said roller is conical.

5. The system claimed in claim 1, wherein said roller further includes: a means that is adjacent said roller and said guide for constraining the web to flatten any preformed web creases.

6. The system claimed in claim 5, wherein said means is contoured to the shape of said surface.

7. The system claimed in claim 1, wherein said system further includes:
- a shaft connected to said roller; and
- guide means connected to said shaft for pushing the web against said surface to flatten any pre-formed web creases.

8. The system claimed in claim 7, wherein said guide is contoured to the shape of said surface.

9. The system claimed in claim 1, wherein said surface, said guide and said roller are pivotable about an axis that is perpendicular to the plane of the web.

10. A lateral constraint system for accurately positioning a web, said system comprises:
- a longitudinal web support surface that is curved in its transverse direction;
- a guide extending longitudinally along said surface;
- a roller positioned against said surface; and
- means for rotating said roller to move a web along said surface; means for deforming said roller when rotated to urge a web laterally against said guide so that the web will conform to the curvature of said surface to increase the strength of the web.

11. The system claimed in claim 9, wherein said roller is canted toward said guide.

12. The system claimed in claim 10, wherein said roller is conical.

13. The system claimed in claim 8, wherein said roller further includes: means that is adjacent said roller and said guide, for pushing the web against said surface to flatten any pre-formed web creases.

14. The system claimed in claim 9, wherein said system further includes:
- a shaft connected to said roller; and
- guide means that is connected to said shaft for pushing the web against said surface to flatten any pre-formed web creases.

15. The system claimed in claim 10, wherein said surface, said means and said roller are pivotable about an axis that is perpendicular to the plane of the web.

* * * * *